United States Patent
Bier

(10) Patent No.: US 8,174,312 B2
(45) Date of Patent: May 8, 2012

(54) APPARATUS AND METHOD FOR SIGNAL PROCESSING OF VOLTAGE SIGNALS FROM ELECTRODES OF A MAGNETO-INDUCTIVE, FLOW MEASURING DEVICE

(75) Inventor: Thomas Bier, Riehen (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 12/734,399

(22) PCT Filed: Nov. 5, 2008

(86) PCT No.: PCT/EP2008/065008
§ 371 (c)(1),
(2), (4) Date: Apr. 29, 2010

(87) PCT Pub. No.: WO2009/060003
PCT Pub. Date: May 14, 2009

(65) Prior Publication Data
US 2010/0231294 A1    Sep. 16, 2010

(30) Foreign Application Priority Data
Nov. 6, 2007    (DE) .......................... 10 2007 053 222

(51) Int. Cl.
*H03F 3/45* (2006.01)
(52) U.S. Cl. ........................................................ 330/69
(58) Field of Classification Search ...................... 330/69
See application file for complete search history.

(56) References Cited

U.S. PATENT DOCUMENTS

| | | | |
|---|---|---|---|
| 4,543,822 A | 10/1985 | Sorrell | |
| 5,041,780 A * | 8/1991 | Rippel | 324/117 H |
| 5,747,700 A | 5/1998 | Wood | |
| 7,073,393 B2 * | 7/2006 | Coursolle | 73/861.12 |
| 2005/0088228 A1 | 4/2005 | Tai | |
| 2006/0080049 A1 | 4/2006 | Budmiger | |

FOREIGN PATENT DOCUMENTS

| | | |
|---|---|---|
| DE | 2 118 092 | 4/1971 |
| DE | 197 16 151 C1 | 8/1998 |
| DE | 100 60 159 A1 | 6/2002 |
| DE | 10 2005 015 807 B3 | 10/2006 |
| EP | 0 062 531 | 10/1982 |
| EP | 0 649 218 A1 | 4/1995 |
| WO | WO 2004/111580 A1 | 12/2004 |

OTHER PUBLICATIONS

Jim Karki, "Fully-Differential Amplifiers", Aug. 1, 2000, Analog Applications Journal, Texas Instruments, pp. 38-41.
James Karki, "Fully-Differential Amplifiers" Jan. 1, 2002, Texas Instruments Application Report, pp. 1-28.

* cited by examiner

*Primary Examiner* — Robert Pascal
*Assistant Examiner* — Khiem Nguyen
(74) *Attorney, Agent, or Firm* — Bacon & Thomas, PLLC

(57) ABSTRACT

Signal processing circuit for voltage signals from electrodes of a magneto-inductive, flow measuring device, wherein two measuring electrodes are connected with a fully differentially working amplifier having two inputs and two outputs.

5 Claims, 2 Drawing Sheets

APPARATUS AND METHOD FOR SIGNAL PROCESSING OF VOLTAGE SIGNALS FROM ELECTRODES OF A MAGNETO-INDUCTIVE, FLOW MEASURING DEVICE

TECHNICAL FIELD

The present invention relates to a signal processing circuit for voltage signals from electrodes of a magneto-inductive, flow measuring device.

BACKGROUND DISCUSSION

Magneto-inductive, flow measuring devices utilize for volumetric flow measurement the principle of electrodynamic induction. When charge carriers of a medium move perpendicularly to a magnetic field, a measurement voltage is induced in measuring electrodes arranged essentially perpendicular to the flow direction of the medium and perpendicular to the direction of the magnetic field. The measurement voltage induced in the measuring electrodes is proportional to the flow velocity of the medium averaged over the cross section of the measuring tube, thus proportional to the volume flow rate. If the density of the medium is known, the mass flow in the pipeline, or in the measuring tube, can be determined. The measured voltage is usually tapped via a measuring electrode pair, which is arranged, as regards the coordinate along the measuring tube axis, in the region of maximum magnetic field strength and where, thus, the maximum measurement voltage is to be expected. The measuring electrodes are usually galvanically coupled with the medium. There are, however, also magneto-inductive, flow measuring devices with capacitively coupled, measuring electrodes. The magnetic field is, most often, periodically reversed, so that measurement voltages with reversing sign arise on the measuring electrodes alternatingly. Besides the measuring electrodes, a magneto-inductive, flow measuring device can also have measured material monitoring electrodes for detecting partially filled or empty measuring tubes and/or reference, or grounding, electrodes for the electrical reference potential between measuring device and measured material.

Usually, the voltage signals of the electrodes of a magneto-inductive, flow measuring device are fed to a differentially working amplifier, called a differential amplifier, for short. This amplifies the difference of the two voltage signals of the electrodes with an amplification gain G. The output signal of the differential amplifier is supplementally increased by an amplifier referenced, offset signal and is then fed to an analog to digital converter, which is referred to in the following as the A/D converter. The voltages are referenced, in such case, to a certain, fixed reference potential, such as e.g. ground, or to a reference electrode of the magneto-inductive, flow measuring device, with which both differential amplifier as well as also the A/D converter work German Patent, DE19716151C1, describes the production of a reference potential. For this, the differential amplifier is connected with a reference electrode or with a measuring electrode.

The wanted signals of the two electrodes are very small in comparison to superimposed, disturbance signals, which are e.g. common-mode signals. The wanted signals lie, conventionally, in the region of a few µV, while the disturbance signals can amount to a few V. Thus, either a high quality of the A/D converter, especially as regards its noise and/or its resolution, is necessary, in order to be able to further process the wanted signals as well as possible, or a suppressing, or filtering out, of the disturbance signals and subsequent amplification of the remaining, wanted signals is used. A/D converters with high resolution are comparatively expensive.

German Patent DE19906004A1 discloses a suppressing, or filtering out, of a common-mode signal by a suppressing of low frequency fractions in the difference signal. In this regard, a preamplifier represents a highpass filter, whose practical implementation leads, however, to a lack of symmetry between the signal paths. For reducing this problem, a resistor network is described. Through the suppressing of the low frequency fractions in the difference signal with the assistance of the highpass filter, thereafter, a high amplification is possible. The amplified signals are then fed to an A/D converter having differential inputs.

SUMMARY OF THE INVENTION

An object of the invention is to provide a simple and cost effective signal processing circuit of a magneto-inductive, flow measuring device yielding a high ratio of wanted signals to disturbance signals.

The object is achieved by the features that a signal processing circuit for voltage signals from electrodes of a magneto-inductive, flow measuring device is provided, wherein two measuring electrodes are connected with a fully differentially working amplifier, wherein the amplifier has two inputs and two outputs. In such case, no suppressing, or filtering out, of the low frequency disturbance signals is required and, thus, the problems of lack of symmetry of the signal paths described in the state of the art do not arise.

Such an amplifier has both differential inputs as well as also differential outputs, i.e. an inverting and a non-inverting input and an inverting and a non-inverting output. Involved, thus, is a fully differential amplifier. In contrast to a differential amplifier, a fully differential amplifier has two outputs with opposite phase signals of nominally equal amplitude, both related to amplified difference of the input signals. On the output of a difference amplifier, there is only the difference of the input signals amplified with an amplification gain G.

An essential idea of the invention is to increase signal amplitude by the use of a fully differential amplifier, in order to increase the signal/noise ratio. Instead of a fixed reference voltage and a difference voltage between two measuring electrodes, the fully differential amplifier outputs a voltage signal of equal phase, and a voltage signal of opposite phase, relative to the difference voltage. In this way, the doubled, wanted signal is suppliable to a following A/D converter.

As in the case of the use of a conventional differential amplifier, the separating of the common-mode signals and wanted signals occurs only after the analog to digital conversion, most often, by software. Thus, a very good separation is possible. However, in comparison to this, in the case of the use of a fully differentially working amplifier, the amplitude of the wanted signal is doubled.

In an advantageous form of embodiment of the apparatus of the invention, it is provided that, at a first output of the fully differentially working amplifier, there is a difference of the two voltage signals of the measuring electrodes amplified by an amplification factor +G and that at a second output of the fully differentially working amplifier, there is a difference of the two voltage signals of the measuring electrodes, amplified with an amplification factor −G. The two outputs deliver signals with nominally equal amplitude, however, in opposite phase, thus the signals are inverted, one relative to the other.

An amplification of the difference signal formed from the input signals is inversely phased. Since, with this circuit, no highpass is implemented, thus low frequency fractions are maintained, disturbance signals decisively limit the amplification factor, i.e. the amplification cannot be increased as much as desired. The symmetry and, thus, the common-mode suppression, in contrast, is very good. The signal/noise ratio of an only so little amplified, difference signal is increased, because the doubled signal amplitude is produced in the fully differential amplifier and fed to a following A/D converter. The internal noise of the A/D converter comes less into play. Therewith, thus, by the fully differential driving of the A/D converter, also the problem of lack of symmetry described in the state of the art does not arise. Likewise, the high requirements on the following A/D converter become therewith smaller. According to the invention, a, in comparison to the state of the art, cheaper A/D converter can be used, which leads to a similar performance of the circuit; or, a standard A/D converter can still be applied, which then leads to a performance increase.

Another advantageous embodiment of the apparatus of the invention provides that there are unipolar signals on the outputs of the amplifier, i.e. the signals are increased by a voltage $u_{offset}$.

If the input signals to the fully differential amplifier are bipolar, i.e. they move, for example, between −2.5V and +2.5V, they must be increased to a unipolar region, e.g. 0V to 5V, since a following A/D converter has, most often, a unipolar input range. According to the invention, the fully differentially working amplifier provides this with two inputs and two outputs as well as an offset input.

In an advantageous further development of the apparatus of the invention, the amplifier outputs are connected with a following A/D converter having differential inputs.

In this way, the doubled signal amplitude is further processable. Through the application of an A/D converter with differential inputs, an amplifier referenced offset is filtered out. Equal parts of amplifier offset subtract out. Through the larger signal amplitude, A/D converter produced noise has less significance as a disturbance.

If the voltage signal of a first measuring electrode is referred to with $u_1$ and the voltage signal of a second measuring electrode with $u_2$, then there lies on the non-inverting output of the differentially working amplifier the value $u_{op}=+G^*(u_1-u_2)+u_{offset}$, with $u_{offset}$ being an amplifier referenced, offset signal, and on the inverting output of the differentially working amplifier the signal $u_{on}=-G^*(u_1-u_2)+u_{offset}$ output, wherein G is an amplification factor, or gain. The A/D converter input voltage $u_{ADC}=u_{op}-u_{on}$ amounts to zero point corrected $2^*G^*(u_a-u_b)$, when $u_1=u_A+u_a$ and $u_2=u_B+u_b$ are composed of the disturbance signals $u_A$, $u_B$ and the wanted signals $u_a$, $u_b$.

Another advantageous form of embodiment of the apparatus of the invention is that wherein the A/D converter following the amplifier is an integrated A/D converter. Through the use of commercially obtainable converters, costs can be reduced. Additionally, integrated circuits have a smaller space requirement.

Another advantageous embodiment of the apparatus of the invention provides that the A/D converter following the amplifier has at least a resolution of 16 Bit. Especially advantageously, a higher resolution of, for example, 24 Bit is used.

For achieving the object, the invention resides furthermore in a method for processing voltage signals from electrodes of a magneto-inductive, flow measuring device, wherein, on a first input of a fully differentially working amplifier, a voltage signal $u_1$ of a first measuring electrode of a magneto-inductive, flow measuring device is applied, and, on a second input of the fully differentially working amplifier, a voltage signal $u_2$ of a second measuring electrode of a magneto-inductive, flow measuring device is applied, and, on a first output of the fully differentially working amplifier, a difference voltage $u_1-u_2$ of the input voltage signals, amplified with an amplification factor +G, is output, and, on a second output of the fully differentially working amplifier, a difference voltage $u_1-u_2$ of the input voltage signals, amplified with an amplification factor −G, is output. Both outputs can, in such case, be increased by a voltage $u_{offset}$.

In an advantageous further development of the method of the invention, on a first input of an A/D converter with differential inputs, a voltage signal $u_{op}$ of the first output of the fully differentially working amplifier is applied and, on a second input of the A/D converter with differential inputs, a voltage signal $u_{on}$ of the second output of the fully differentially working amplifier is applied, and the A/D converter with differential inputs converts an analog signal $u_{ADC}=u_{op}-u_{on}$ into a digital signal.

BRIEF DESCRIPTION OF THE DRAWINGS

The invention and selected examples of embodiments will now be explained in greater detail on the basis of the appended drawing. For simplification, in the drawings, identical parts are provided with equal reference characters. The figures of the drawing show as follows.

DETAILED DISCUSSION IN CONJUNCTION WITH DRAWINGS

Figure 1:
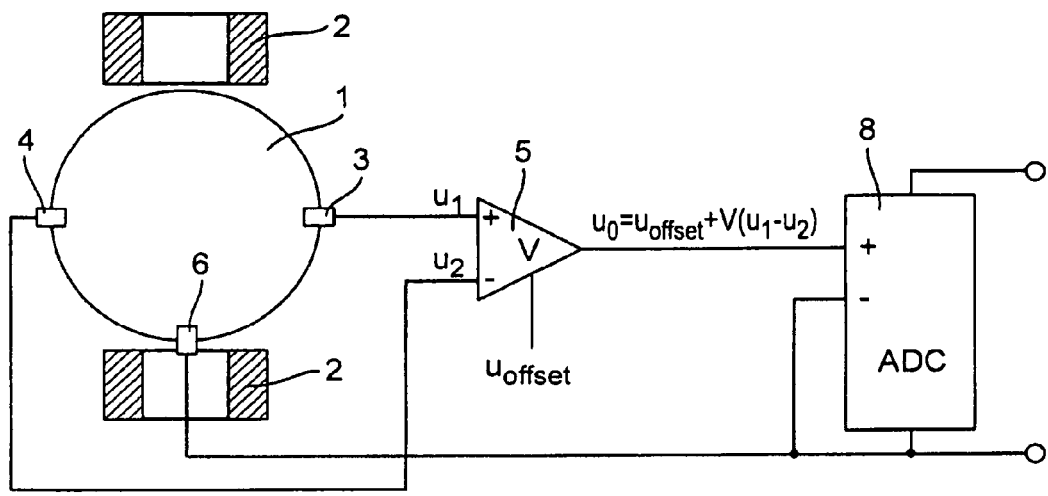
FIG. 1 is a representation of a signal processing circuit corresponding to the state of the art, without a suppressing, or filtering out, of the low frequency disturbance signals.
Figure 2:
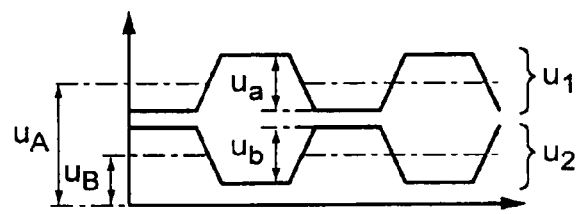
FIG. 2 shows voltage as a function of time for the circuit of FIG. 1.
Figure 2:
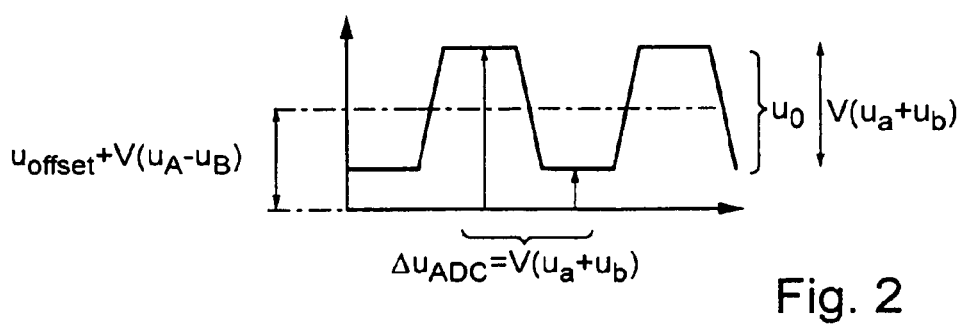

FIG. 1 shows a signal processing circuit of the state of the art. FIG. 2 shows the associated voltage-waveforms for the measurement electrode voltages and the A/D converter input voltage. For purposes of simplification, the two figures are considered and explained together. A magneto-inductive measuring device is schematically presented. It is composed of two oppositely lying field coils 2, which are placed on a measuring tube 1 and produce a magnetic field. Two oppositely lying measuring electrodes 3 and 4 are connected with two inputs of a differentially working amplifier 5. The measurement electrode voltage signals $u_1$ and $u_2$ are, in such case, referenced to ground, or to the potential of a reference electrode 6.

The amplifier 5 amplifies the difference signal with the amplification factor V and, thus, there lies on the output of the amplifier the voltage signal $u_o=V^*(u_1-u_2)+u_{offset}$. The measurement electrode voltages $u_1$ and $u_2$ are composed of disturbing voltages $u_A$, $u_B$ and wanted signals $u_a$, $u_b$. The voltages $u_a$ and $u_b$ are, from symmetry grounds, of opposite phase. The voltage $u_{offset}$ represents an amplifier offset voltage. The waveforms of the voltages are caused by the periodic reversal of the magnetic field. If the magnetic field is positive, one measurement voltage of a measuring electrode is positive, the other negative. In the case of negative magnetic field, the voltages reverse. The wanted signals are in the range of a few μV, while the disturbing voltages can be a few V.

The output signal is fed to a first input of an A/D converter 8, on whose second input the signal of the reference electrode lies. The waveform of the signal to be digitized is, in turn, shown in FIG. 2.

Figure 3:
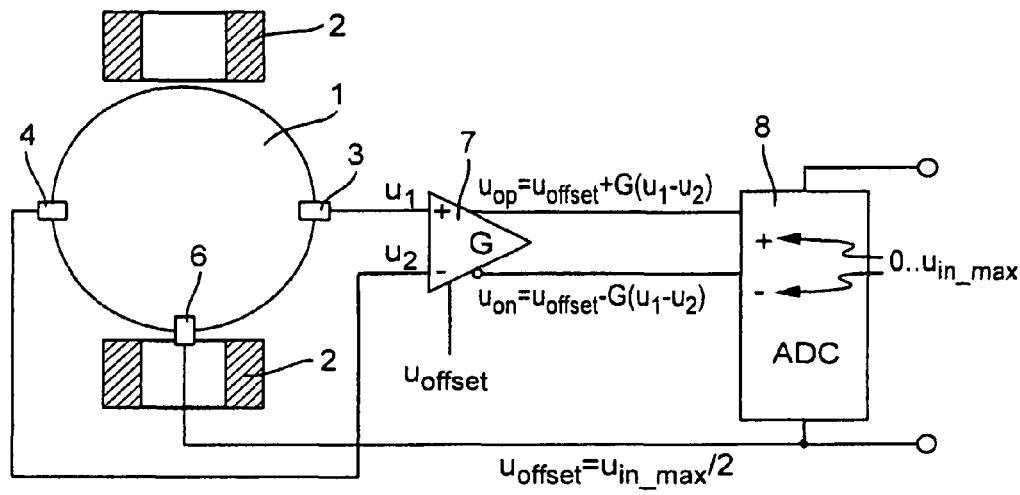
FIG. 3 is a representation of a signal processing circuit of the invention.
Figure 4:
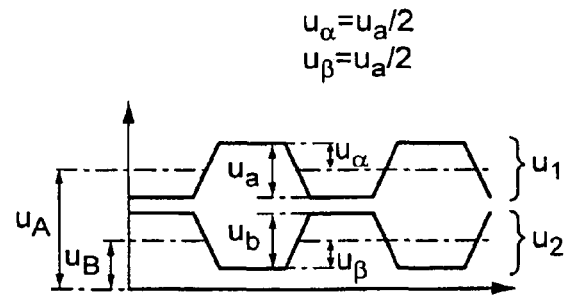
FIG. 4 shows voltage as a function of time for the circuit of FIG. 3.
Figure 4:
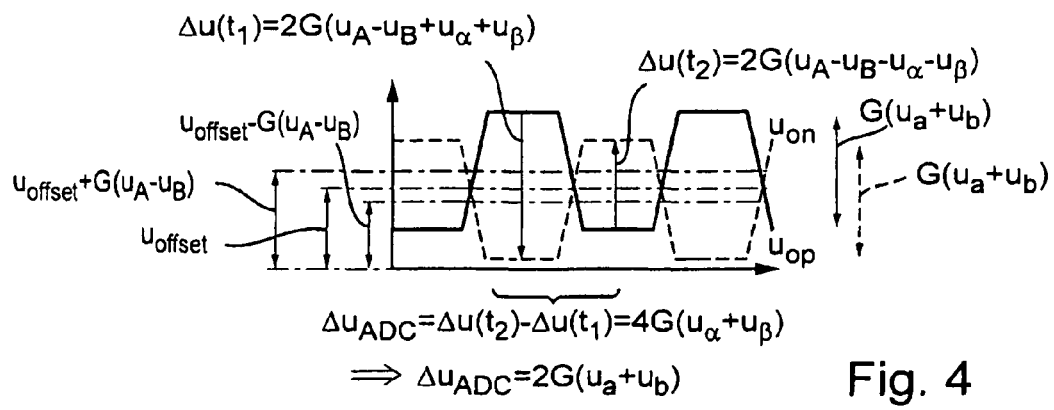

FIG. 3 shows a signal processing circuit of the invention and FIG. 4 shows the associated waveforms of the measurement electrode voltages and the A/D converter input voltage. For purposes of simplification, again, the two figures are considered and explained together. As earlier, the oppositely lying measuring electrodes 3 and 4 are connected with the inputs of a differentially working amplifier 7. Amplifier 7 is, however, in this case, a fully differential amplifier with two outputs.

Amplifier 7 amplifies the difference signal with the amplification gain G and, thus, there lies on the first output of the amplifier the voltage signal $u_{op}=G*(u_1-u_2)+u_{offset}$ and on the second output the signal $u_{on}=-G*(u_1-u_2)+u_{offset}$. The measurement electrode voltages $u_1$ and $u_2$ are, as before, composed of disturbing voltages $u_A$, $u_B$ and the wanted signals $u_a$, $u_b$. The voltage $u_{offset}$ represents an amplifier offset voltage.

The output signals of the amplifier are fed to the differential inputs of an A/D converter 8. The voltages are, in turn, referenced to the reference electrode 6. The waveform of the signal to be digitized is, in turn, shown in FIG. 4. It has double the signal amplitude.

The invention claimed is:

1. A signal processing circuit for voltage signals from electrodes of a magneto-inductive, flow measuring device, comprising:
    a fully differentially working amplifier having two inputs and two outputs;
    a following A/D converter having differential inputs; and
    two measuring electrodes connected to said fully differentially working amplifier, wherein:
    on a first output of said fully differentially working amplifier, there lies a difference of the two voltage signals of said two measuring electrodes amplified with an amplification factor +G;
    on a second output of said fully differentially working amplifier, there lies a difference of the two voltage signals of said two measuring electrodes amplified with an amplification factor −G; and
    said fully differentially working amplifier outputs are connected with said following A/D converter.

2. The signal processing circuit as claimed in claim 1, wherein:
    unipolar signals are on the outputs of said fully differentially working amplifier.

3. The signal processing circuit as claimed in claim 1, wherein:
    said A/D converter following said differentially working amplifier is an integrated A/D converter.

4. The signal processing circuit as claimed in claim 1, wherein:
    said A/D converter following said fully differentially working amplifier has at least a resolution of 16 Bit.

5. A method for processing voltage signals from electrodes of a magneto-inductive, flow measuring device, comprising the steps of:
    applying on a first input of a fully differentially working amplifier, a voltage signal $u_1$ of a first measuring electrode of a magneto-inductive, flow measuring device;
    applying on a second input of the fully differentially working amplifier, a voltage signal $u_2$ of a second measuring electrode of a magneto-inductive, flow measuring device;
    applying on a first output of the fully differentially working amplifier, a difference voltage $u_1-u_2$ of the input voltage signals, amplified with an amplification factor +G;
    applying on a second output of the fully differentially working amplifier, a difference voltage $u_1-u_2$ of the input voltage signals, amplified with an amplification factor −G applying on a first input of an A/D converter having differential inputs, a voltage signal $u_{op}$ of the first output of the fully differentially working amplifier;
    applying on a second input of the A/D converter having differential inputs, a voltage signal $u_{on}$ of the second output of the fully differentially working amplifier; and
    the A/D converter having differential inputs converts an analog signal $ADC=u_{op}-u_{on}$ into a digital signal.

* * * * *